Patented Apr. 26, 1938

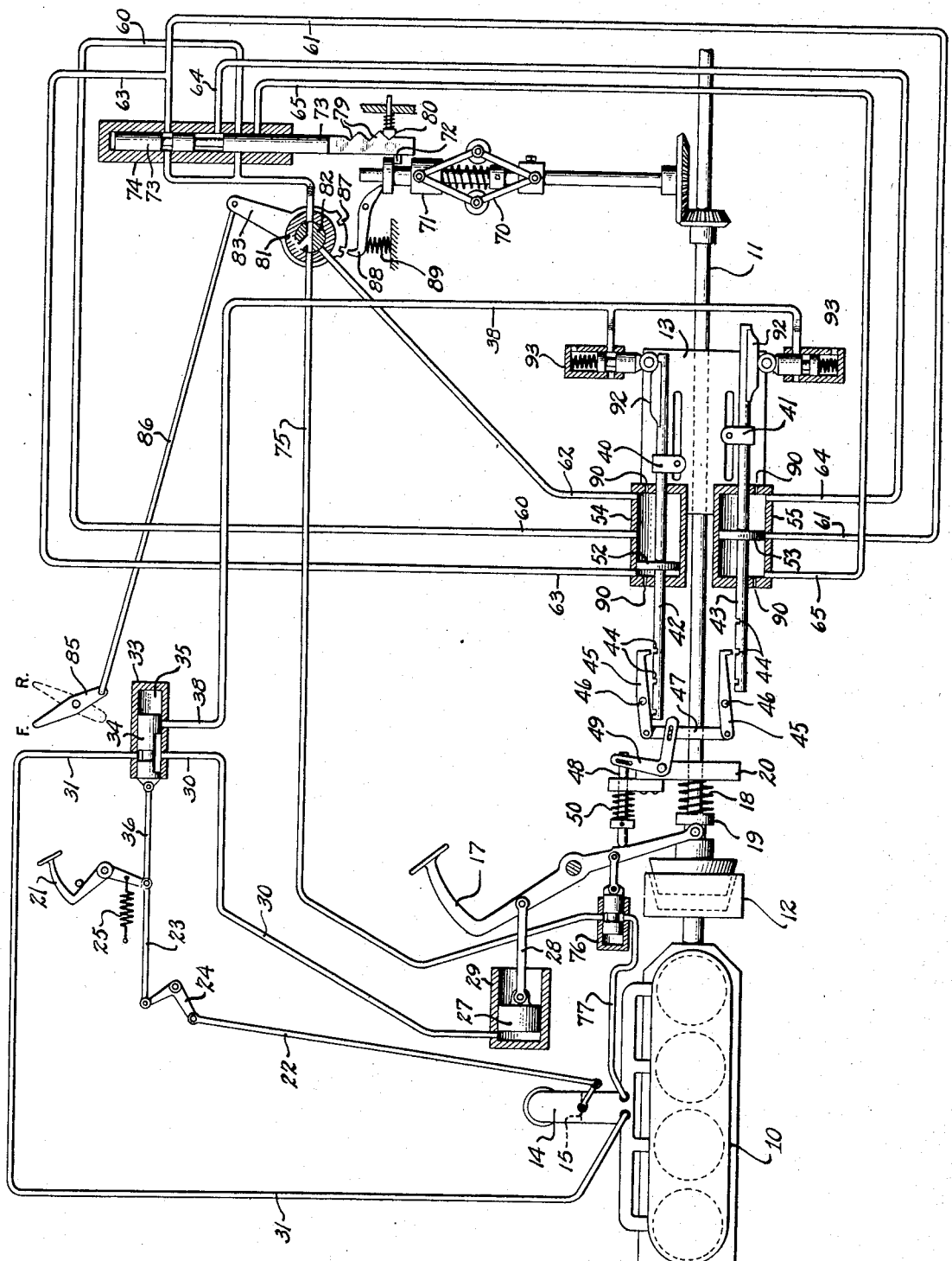

2,115,097

UNITED STATES PATENT OFFICE 2,115,097

VACUUM-OPERATED GEAR SHIFTING DEVICE

Hobart N. Durham, Manhasset, N. Y., assignor, by mesne assignments, to Vaco Products, Inc., a corporation of Delaware Application April 6, 1934, Serial No. 719,271

8 Claims. (Cl. 192—.01)

The present invention relates to vacuum-operated gear shifting means for automotive vehicles, and more particularly to a novel and improved gear shifting means for automatically selecting the gear ratio in accordance with the speed of the vehicle.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serve to explain the principles of the invention.

The single figure of the drawing is a diagrammatic view showing an illustrative embodiment of the present invention.

The present invention has for its object the provision of a novel and improved speed controlled, vacuum-operated gear shifting device particularly adapted for use with automotive vehicles. Another object is the provision of a vacuum-operated gear shifting device in which the gears cannot be shifted to a reverse speed while the vehicle is moved forwardly, and vice versa. Still another object is the provision of a vacuum-operated gear shifting device having means preventing the engagement of the clutch while the gears are being changed from one speed to another, or when they are not in meshed or power-transmitting relation.

In accordance with the illustrative embodiment of the invention, an internal combustion engine transmits power through a clutch and conventional change speed gearing to the propeller shaft of a vehicle. Means are provided for releasing the clutch by the suction created by the engine, these means being operative to release the clutch whenever the throttle is closed, and operative to cause engagement of the clutch under certain conditions whenever the throttle is open. Means are also provided for preventing shifting from one speed to another unless the clutch is released, as well as for preventing engagement of the clutch except when the gears are fully meshed in one position or another, thereby preventing any clashing of the gear piece while shifting.

When the clutch is disengaged, vacuum-operated means controlled by the speed of the vehicle operate to shift the gears into the proper speed as determined by the vehicle speed. Other means are provided influencing the shifting control mechanism so that too frequent or unnecessary shifting of gears is avoided, also serving to eliminate any neutral points on control which might otherwise exist. Means under control of the operator are also provided for shifting the gears into reverse speed when so desired.

It will be understood that the foregoing general description and the following detailed description as well are exemplary and explanatory of the invention, but are not restrictive thereof.

Referring now in detail to the illustrative embodiment of the invention as shown in the accompanying drawing, there is provided an internal combustion engine 10 adapted to drive propeller shaft 11, through clutch 12 and a selective, change speed transmission 13 of conventional construction. The engine 10 is provided with the usual intake manifold 14 in which is positioned a throttle valve 15 to regulate the flow of combustible mixture to the engine. Clutch 12 is adapted to be opened and closed by movement of the clutch pedal 17, and is normally held in engaged or power-transmitting relation by the pressure of spring 18, compressed between the clutch release collar 19 and the stationary member 20. The throttle valve 15 is connected to an accelerator pedal or hand throttle 21 by means of links 22 and 23 and bell crank 24, and is normally held in closed or idle position by means of spring 25.

Vacuum-operated means are provided for controlling and operating the clutch by the accelerator pedal 21, and for this purpose, piston 27 is connected with the clutch pedal 17 by link 28 and is slidable in cylinder 29. Clutch 12 is released by means of suction applied to the cylinder 29 through suction pipes 30 and 31 which connect cylinder 29 with the engine side of the intake manifold 14, and the operation of cylinder 29 is controlled by the accelerator pedal 21 through valve 33. This valve comprises a valve plunger 34 positioned within a cylinder 35, the plunger being connected with the accelerator pedal through link 36. Plunger 34 is cut away so that in the closed position of the throttle and when the engine is idle, suction is applied by connecting pipes 30 and 31, whereas on opening the throttle, pipe 31 is blocked and pipe 30 is connected to atmosphere through pipe 38 serving to bleed the cylinder 29 and allow engagement of the clutch 12 under the influence of spring 18.

The transmission 13 is of the conventional selective sliding gear type and may comprise gears for driving the car in reverse, first, second and third speeds. As is usual, such gearing is adapted to be shifted from one speed to another by means of two independently operable, slidable forks 40 and 41, either of which may be moved from neutral to either of its other positions while the other fork is in its central and neutral position. Movement of the fork 40 to the right shifts the gears into reverse, movement to the extreme left position shifts them to first speed, and by returning the fork 40 to its central position, the fork 41 may be shifted to the right to shift the gears to second speed or to the left to shift them into direct or high speed.

Means are provided under control of the clutch for preventing movement of the gear shifting forks 40 and 41 except when the clutch is disengaged. As embodied, each of the forks 40 and 41 is rigidly connected to a slidable piston rod 42 and 43, and these rods at one end are provided with notches 44 adapted to be engaged by pivoted latches 45, thereby holding the rods against movement. Latches 45 are pivoted at 46 and connected together at their forward end by link 47 adapted to be moved by plunger 48 operating through pin and slot connections in the pivoted bell crank 49. A spring 50 is provided for forcing the plunger 48 against the clutch lever 17 to cause engagement of the latches 45 with one notch 44 on each rod whenever the clutch is engaged, thereby locking the gears against shifting movement.

Vacuum-operated means are provided for shifting the gears by movement of the forks 40 and 41, and as embodied, two pistons 52 and 53 are provided, operating in cylinders 54 and 55 respectively. For moving the pistons 52 and 53 within their respective cylinders, vacuum pipes, connected with the intake manifold of the engine, are provided. Neutral pipes 60 and 61 are connected to the central portion of cylinders 54 and 55 respectively, while the reverse pipe 62 is connected to the rear end of cylinder 54, the first speed pipe 63 is connected to the forward end of this cylinder, the second speed pipe 64 is connected to the rear end of cylinder 55 and the high speed pipe 65 is connected to the forward end of cylinder 55. By applying vacuum to the cylinders through these pipes, the pistons 52 and 53 and the gear shifting forks 40 and 41, the gears may be shifted to their several positions.

Speed controlled means operating in accordance with the vehicle speed are operated for controlling the connection of the various pipes to the intake manifold, and for this purpose a centrifugal governor 70 is driven from the propeller shaft 11 and is provided with a grooved collar 71 cooperating with a pin 72 projecting laterally from a valve plunger 73 slidable in valve casing 74. In the position shown in the drawing, which is the position of the parts with the vehicle at rest or slowly moving, the pipes 61 and 63 are connected through the valve to the pipe 75 and through the clutch-operated valve 76 to pipe 77 which opens into the intake manifold. Valve 76 is open only when the clutch is disengaged, and at this time the air is exhausted through pipes 61 and 63 to position the pistons 52 and 53 in first speed position, as shown. As the speed of the vehicle increases (for instance to 8 M. P. H.), the valve plunger 73 is moved downwardly, closing off the pipes 61 and 63 and connecting pipes 60 and 64 to the intake manifold as soon as the operator next closes the throttle to cause disengagement of the clutch 12 and opening of the valve 76. Under these conditions, the piston 52 is returned to its central or neutral position, and piston 53 is moved to its second speed position.

The operator may then again open the throttle causing engagement of the clutch and acceleration of the vehicle, and when sufficient speed (say 15 M. P. H.) has been attained to move the valve 73 to its high speed position, pipes 60 and 65 are connected with the intake manifold so that when the clutch is next disengaged, the piston 53 is moved to its high speed position.

For preventing the valve plunger 73 from remaining in inoperative or dead positions, when shifting should take place, means are provided for retarding and then assisting movement of the plunger from one to another of its positions. As embodied, the end of the plunger 73 is toothed as at 78, the indentations between the teeth corresponding to the proper gear-shifting positions of the valve, and a spring-pressed detent 80 fits within the indentation and is adapted to be displaced on movement of the valve plunger 73. Pin 72 is preferably considerably smaller than the groove in collar 71 so as to provide lost motion permitting the valve plunger to jump from one position to the next.

For shifting the gears to reverse speed position, a reversing valve is provided adapted for manual operation. This valve is positioned in the line 75 and comprises a stationary shell 81 within which is rotatable a valve core 82 connected to the operating lever 83. In its forward position the valve core 82 connects the line 75 with the valve body 74, whereas by rotating the core 82 counterclockwise the pipe 75 is connected to pipe 62, causing piston 52 to be moved shifting the gears into reverse. A manual control lever 85, conveniently positioned, is connected to lever 83 by means of rod 86.

Means are provided for preventing movement of valve core 82 while the vehicle is in motion, and for this purpose lever 83 is notched as at 87 and a pivoted latch 88 is urged into one or the other of the notches 87 by a spring 89, and is retracted from the notches by means of the governor 70 whenever the vehicle is stationary.

Cylinders 54 and 55 are vented to atmosphere at each end, by means of the restricted vents 90 which are considerably smaller than the pipes 60 to 65, thereby permitting easy movement of the pistons from one position to another.

Means are also provided for preventing engagement of the clutch except when the gears are fully meshed in one speed or another. As embodied, each of the rods 42 and 43 is provided with a cam 92 cooperating with valves 93 which are adapted to admit air to pipe 38. When pistons 52 and 53 are in neutral position, both valves 93 are closed, and air is not admitted to cylinder 28 to engage the clutch except when one or the other of pistons 52 and 53 has been moved to a gear meshing position, thereby opening one or the other of the valves 93.

The operation of the illustrative embodiment shown in the drawing may be summarized as follows:

When the automobile is at rest and the operator's foot is off the accelerator pedal 21, the parts are in the position shown in the drawing. As the throttle is opened, the clutch-operating cylinder 28 is bled through valve 33 and the transmission-controlled valve 93, thereby causing the clutch to engage, locking the gear-shifting pistons 52 and 53 against movement, interrupting the vacuum applied through valve 74 and setting the automobile in motion.

When a speed of approximately 8 M. P. H. has been reached, the governor 70 has moved the slide valve 73 to its second speed position, and when the operator next releases his foot from the accelerator pedal 21, vacuum is applied through valve 34 to disengage the clutch 12, thereby opening the valve 76 and applying vacuum through valve 82 and valve 73 to pipes 60 and 64, centering piston 52 and moving piston 53 to second speed position. While the clutch 12 is released, the latches 45 are also released, permitting movement of the pistons 52 and 53. Valves 93 are open to permit engagement of the clutch only when one or the other of the pistons 52 and 53 has been moved from central or neutral position. When the operator next depresses the accelerator pedal 21, the car accelerates and with the throttle sufficiently open, reaches a speed such that valve slide 73 is moved to high speed position. When the operator releases the accelerator pedal, the operations previously described follow and vacuum is applied through pipe 65 to shift pistons 53 to high speed position. The operator may then open the throttle again, causing the clutch to be engaged and locking the transmission gears in high speed position.

Whenever the automobile is in motion, either forward or reverse, the governor 70 moves the latch 88 into engagement with one or the other of notches 87, preventing any movement of the reversing valve 82. While the car is stationary, the valve 82 may be moved to reverse position, and when so moved, vacuum line 75 is connected to the vacuum line 62. With the clutch disengaged, suction is applied to line 62, moving the piston 52 to the right or into reverse position. Thereafter, on opening the throttle, the clutch is engaged locking the piston rods 42 and 43 against movement.

The invention in its broader aspects is not limited to the specific mechanisms shown and described but departures may be made therefrom within the scope of the accompanying claims without departing from the principles of the invention and without sacrificing its chief advantages.

What I claim is:

1. A gear shifting device for automotive vehicles having a vacuum producing source of power, a clutch, change speed gearing through which the vehicle is driven including in combination vacuum operated means for changing gears, vacuum operated means for disengaging said clutch, speed controlled means for controlling said first means, a fuel control element for controlling operation of the clutch disengaging means and means preventing engagement of said clutch while the gears are being changed from one speed to another.

2. A gear shifting device for automotive vehicles having a vacuum producing source of power, a clutch, change speed gearing through which the vehicle is driven including in combination vacuum operated means for changing gears, vacuum operated means for disengaging said clutch, speed controlled means for controlling said first means, a fuel control element for controlling operation of the clutch disengaging means and means preventing engagement of said clutch until after the gears have meshed.

3. A gear shifting device for automotive vehicles having an internal combustion engine, change speed gearing for transmitting power from said engine to drive the vehicle and including in combination vacuum operated means for shifting said gearing including a manually-operable reversing valve and means for preventing movement of said valve when the vehicle is moving.

4. A gear shifting device for automotive vehicles having an internal combustion engine, change speed gearing for transmitting power from said engine to drive the vehicle and including in combination vacuum operated means for shifting said gearing including pistons for shifting said gearing to different forward speeds and reverse, a speed controlled valve for controlling movement of said pistons, a reversing valve and means preventing movement of said reversing valve when the vehicle is moving.

5. A gear shifting device for automotive vehicles having an internal combustion engine driving the vehicle through a change speed transmission and a clutch and including in combination an accelerator controlled automotive clutch, operating means for shifting the gears of the transmission and means preventing engagement of said clutch while said gears are being shifted.

6. A gear shifting device for automotive vehicles having an internal combustion engine driving the vehicle through a change speed transmission and a clutch and including in combination an accelerator controlled automatic clutch operating means, means for shifting the gears of the transmission, means preventing engagement of said clutch while said gears are being shifted and means preventing shifting of said gears while said clutch is engaged.

7. A gear shifting device for automotive vehicles having an internal combustion engine driving the vehicle through a change speed transmission and a clutch and including in combination vacuum operated means for disengaging and engaging said clutch under control of an accelerator, and means controlled by the position of the gears for preventing engagement of the clutch under control of said accelerator.

8. A gear shifting device for automotive vehicles having an internal combustion engine, change speed gearing for transmitting power from said engine to drive the vehicle and including in combination vacuum operated means for shifting said gearing including valve means for optionally selective reverse and means preventing movement of the valve means to its reverse position when the vehicle is moving at a substantial speed.

HOBART N. DURHAM.